Patented Jan. 3, 1928.

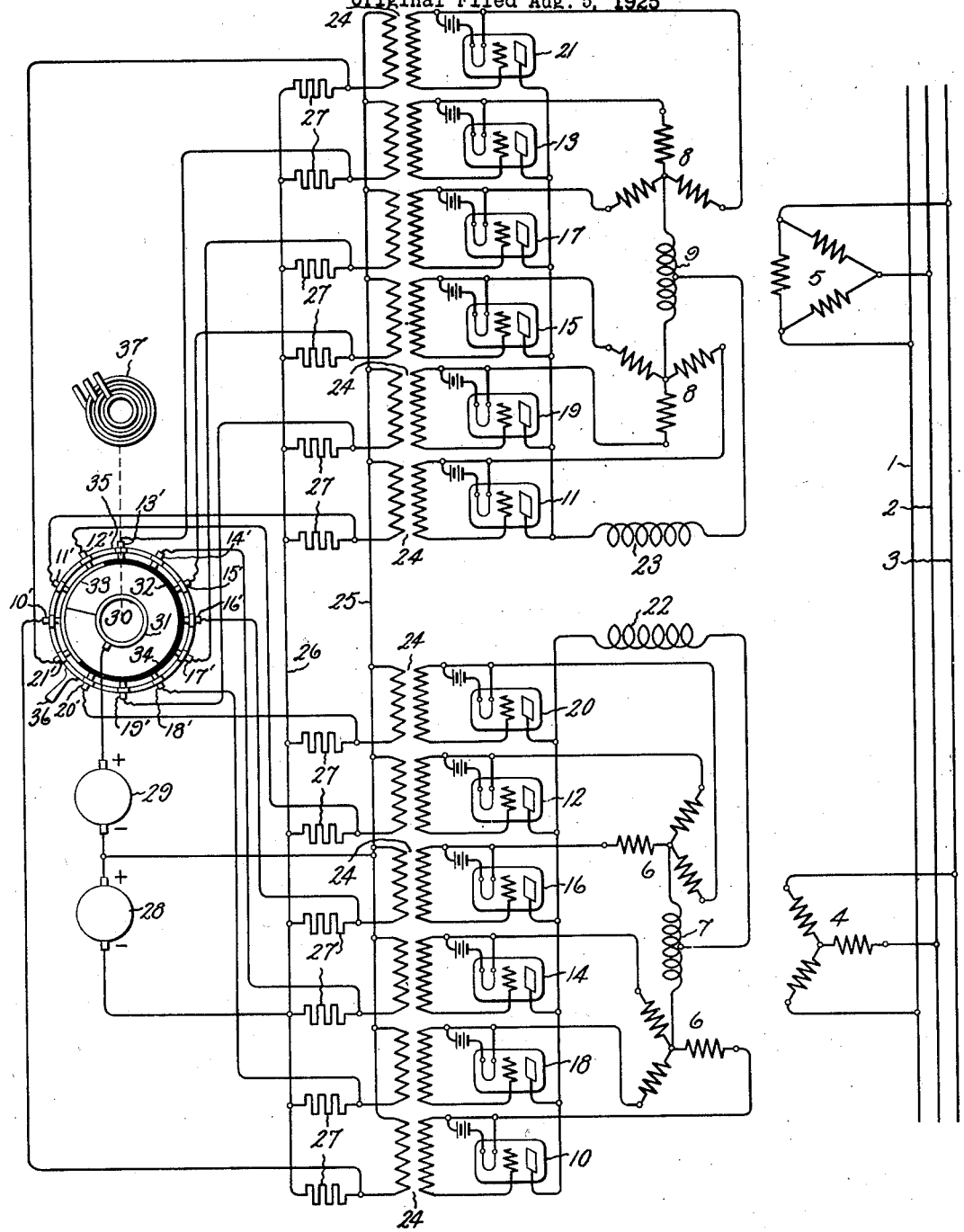

1,655,038

UNITED STATES PATENT OFFICE.

ERNST F. W. ALEXANDERSON, OF SCHENECTADY, NEW YORK, ASSIGNOR TO GENERAL ELECTRIC COMPANY, A CORPORATION OF NEW YORK.

POWER-FACTOR CONTROL SYSTEM.

Application filed August 5, 1925, Serial No. 48,364. Renewed November 22, 1927.

My present invention relates to alternating current systems, and more particularly to means for controlling the power factor of such systems.

It is an object of my invention to provide an arrangement whereby the power factor of an alternating current power system may be controlled by means of electron discharge devices.

The novel features which I believe to be characteristic of my invention are set forth with particularity in the appended claims. My invention itself, however, both as to its organization and method of operation will best be understood from the following specification taken in connection with the accompanying drawing in which the figure shows diagrammatically a circuit organization whereby my invention may be carried into effect.

Referring to the drawing, I have indicated at 1, 2 and 3 the mains of a three-phase alternating current system. Associated with the mains are a Y connected primary transformer winding 4, and a delta connected transformer winding 5. A double Y connected secondary transformer winding 6 having an interphase winding 7 connected to the mid point of each Y is inductively associated with winding 4. A similar secondary winding 8, and interphase winding 9 is associated with the primary transformer winding 5. The secondary windings of the transformers are connected to the cathode elements of a plurality of high vacuum, thermionic, discharge devices 10–21 inclusive. The anodes of the discharge devices associated with each secondary transformer winding are connected together and to the mid point of the interphase winding of the associated secondary winding through reactances 22 and 23.

In order to produce the equivalent of an inductive reactance or a condenser in the alternating current system I control the energization of the grids of the respective discharge devices so that the phase of the current that the discharge devices permit to flow may be varied with respect to the voltage of the alternating current system. I accomplish this result by connecting the grid of each tube to the secondary winding of one of the transformers 24. The primary windings of each transformer 24 are connected across a pair of mains 25 and 26 through a resistance 27. A direct current source of supply 28 is connected to the primary windings of transformer 24 so as to include resistance elements 27, and to normally impress a negative potential on the grids of the various tubes. A second direct current source of supply 29 is adapted to be connected to the primary windings of transformer 24 through a rotating commutator 30 in such a manner that the resistance 27 is excluded from the circuit and a positive potential is intermittently and regularly supplied to the grid elements of the tubes.

The commutator 30 comprises a conducting ring 31, and a ring 32, the latter being provided with a conducting segment 33, connected to ring 31, and a non-conducting segment 34. A plurality of brushes 10' to 21', mounted on a ring 35, cooperate with ring 32. A handle 36 provides means for adjusting the position of the brushes on ring 32. With secondary windings such as shown at 6 and 8 the conducting segment of the commutator is of sufficient width so that four brushes are always in contact with the conducting segment 33. The commutator is rotated at a substantially constant speed by means of a synchronous motor 37 which may be energized, if desired, from the three-phase mains 1, 2 and 3.

In operation a negative potential is normally impressed on the grids of the inactive tubes by means of the direct current source 28 through resistance 27, while a positive potential is intermittently and regularly supplied to a plurality of the tubes from source 29 through commutator 30. When positive potential is supplied to the tubes, current is permitted to flow therethrough. The time relation of the positive potential supplied to the grids and the potential of the alternating current system may be varied by means of the adjustable ring 35, and in this manner the phase of the current that the tubes allow to flow can be shifted with respect to the voltage of the alternating current system. By shifting the brushes any power factor desired may be obtained, and by shifting the brushes in the proper direction and to the proper extent the power factor can be made practically zero leading or lagging.

By the use of the particular transformer connections shown between the tubes and alternating current system, a desirable wave form is obtained. The particular type of connection shown, however, is not essential for the operation of the device. Any type of transformer connection desired may be made between the alternating system and the tubes.

Various modifications of my invention will readily suggest themselves to persons skilled in the art without departing from the scope of my invention as set forth in the appended claims.

What I claim as new and desire to secure by Letters Patent of the United States, is:—

1. The combination of an alternating current circuit comprising a pair of conductors, an electron discharge device provided with a cathode and an anode connected between said conductors and with a grid arranged to control the current transmitted between said cathode and anode, means operated synchronously with said circuit for applying potential impulses to said grid, and means arranged to vary the time relation between said impulses and the alternations in the voltage of said pair of conductors.

2. In combination, an alternating current transmission system, means for producing the equivalent of an inductive or capacity reactance in said system, said means including an electron discharge device and means for regularly and intermittently supplying a positive potential to said device to permit the flow of current therethrough.

3. In combination, an alternating current transmission system, means for producing the equivalent of an inductive or capacity reactance in said system, said means including an electron discharge device, said device including a cathode, an anode, and a grid, and means for regularly and intermittently supplying a positive potential to said grid to permit the flow of current through said discharge device.

4. In combination, an alternating current transmission system, a plurality of electron discharge devices, a transformer having a primary winding connected to said system and a secondary winding connected to said discharge devices, and means for regularly and intermittently supplying a positive potential to said discharge devices to permit current to flow therethrough, and means for varying the time relation of the potential supplied to said discharge devices and the potential of said alternating current system.

5. In combination, an alternating current system, a plurality of high vacuum discharge devices, a transformer having a primary winding connected to said system, and a secondary winding connected to said discharge devices, a consumption circuit connected to said secondary winding and to said discharge devices, and means for intermittently and regularly supplying a positive potential to a plurality of said discharge devices to control the phase of the current flowing in said consumption circuit with respect to the potential of the alternating current system.

6. The combination of an alternating current circuit comprising a pair of conductors, an electron discharge device provided with a cathode and an anode connected between said conductors and with a grid arranged to control the current transmitted between said cathode and anode, means arranged to bias said grid to a negative potential, and means operable to reverse the potential of said grid synchronously with alternations in the voltage of said pair of conductors.

7. In combination, an alternating current system, a plurality of electron discharge devices connected to said system, each of said devices including a cathode, an anode and a grid, means for regularly and intermittently impressing a positive potential on said grids, said means comprising a commutator and cooperating brushes, and means for varying the position of said brushes on said commutator to vary the time relation of the potential on said grids and the potential of said system.

In witness whereof, I have hereunto set my hand this 3d day of August, 1925.

ERNST F. W. ALEXANDERSON.